United States Patent [19]

Sheridan et al.

[11] Patent Number: 5,137,192
[45] Date of Patent: Aug. 11, 1992

[54] CARRIER RACK APPARATUS MOUNTABLE TO VEHICLE REAR DOOR SPARE TIRE MOUNT

[76] Inventors: Daniel J. Sheridan, 2061 H Street, Santa Margarita, Calif. 93453; Bruce A. Mosher, 1220 Bennett Way, Apt. 62, Templeton, Calif. 93465

[21] Appl. No.: 767,216

[22] Filed: Sep. 30, 1991

[51] Int. Cl.[5] .............................................. B62D 43/02
[52] U.S. Cl. .................................. 224/42.130; 211/17; 224/42.45 R
[58] Field of Search .......... 224/42.13, 42.06, 42.03 B, 224/42.24, 42.45 R, ; 414/463; 211/17 X

[56] References Cited

U.S. PATENT DOCUMENTS

| | | | |
|---|---|---|---|
| 3,972,457 | 8/1976 | Kesler | 224/42.13 X |
| 4,189,074 | 2/1980 | Davies | 224/42.13 X |
| 4,392,597 | 7/1983 | Traugh | 224/42.13 |
| 4,416,402 | 11/1983 | Matthew | 414/463 X |
| 4,676,413 | 6/1987 | Began et al. | 224/42.03 B |
| 4,676,414 | 6/1987 | Deguevara | 224/42.03 B X |
| 4,884,728 | 12/1989 | Temple | 224/42.03 B X |
| 4,915,274 | 4/1990 | Oliver | 224/42.24 |
| 4,948,021 | 8/1990 | Murphy et al. | 224/42.13 |
| 5,004,133 | 4/1991 | Wyers | 224/42.45 R |
| 5,007,567 | 4/1991 | Foster | 224/42.13 |
| 5,085,360 | 2/1992 | Fortune et al. | 224/42.13 |

Primary Examiner—Henry J. Recla
Assistant Examiner—Glenn T. Barrett
Attorney, Agent, or Firm—Kenneth E. Darnell

[57] ABSTRACT

Carrier rack apparatus for mounting bicycles, skiis and the like to the existing exterior spare tire mount on the rear door of a vehicle, the invention in its several embodiments provide a mounting hub sandwiched between the existing spare tire mounting device carried on the rear door of a vehicle and the wheel of the spare tire carried on the door. This mounting hub detachably receives a carrier rack configured according to the invention and which mounts articles such as one or more bicycles, skiis, a gas can, etc. Preferred embodiments of the invention provide carrier rack structures which are adjustable both vertically and also in at least one horizontal sense, these preferred rack structures being capable of adjustable movement in six degrees of freedom.

20 Claims, 5 Drawing Sheets

CARRIER RACK APPARATUS MOUNTABLE TO VEHICLE REAR DOOR SPARE TIRE MOUNT

BACKGROUND OF THE INVENTION

1. Field of the Invention

The invention relates generally to rack devices capable of carrying articles such as bicycles, skiis and the like on the exterior of vehicles and particularly to several related embodiments of carrier racks mountable to existing spare tire carriers on a rear door of a vehicle.

2. Description of the Prior Art

Article carriers, particularly bicycle carriers, removably mountable to the exterior of a vehicle have long been known in the art. Such prior devices commonly mount bicycles and other articles on the roof of a vehicle or on the rear of a vehicle with attachment to vehicle structure such as a bumper, trailer hitch and even a spare tire and wheel mounted externally of a vehicle on a rear door thereof. As examples, Traugh in U.S. Pat. No. 4,392,597; Temple in U.S. Pat. No. 4,884,728; and Davies in U.S. Pat. No. 4,189,074 generally describe bicycle racks or similar article carriers removably mounted in association with a spare tire mounted externally of a vehicle. The devices disclosed in these patents generally provide resilient or spring-loaded structures which mount about the spare tire itself under tension and hold a bicycle or other article so that the article can be transported by the vehicle without utilizing vehicle interior space. In U.S. Pat. No. 4,676,413 to Began et al and U.S. Pat. No. 4,676,414 to DeGuevara, tubular article carriers are disclosed which include a "foot" portion received within a trailer hitch. Even in view of the large number of bicycle and other article carriers which have been provided in the prior art, a need continues to exist in the art for a simple, light-weight and easily removable carrier apparatus which can be mounted to a rear door of a vehicle in association with a spare tire and wheel carried on the door of the vehicle. A long-felt need has also existed in the art for such an article carrier apparatus which can mount more than one bicycle or the like safely above a road bed with enough clearance therefrom to avoid road hazards as well as to position more than one bicycle safely above the hot exhaust of the vehicle on which the bicycles are carried. A further need has been felt in the art for a carrier rack apparatus which allows opening and closure of the vehicle rear door with the carrier and bike attached to the existing spare tire mounting arrangement.

The present invention provides solution to these long-felt needs in the art and further provides mounting arrangements which are adjustable both vertically and in horizontal directions both parallel to and perpendicularly to the longitudinal axis of the vehicle on which the carrier rack apparatus is mounted. In addition to being readily detachable from the spare tire mounting arrangement of a vehicle, the present carrier rack apparatus can be readily locked so that the carrier rack apparatus cannot be removed by unauthorized persons.

SUMMARY OF THE INVENTION

The invention provides several related embodiments of carrier rack apparatus capable of mounting bicycles, skiis and similar articles to the existing spare tire mount such as is commonly found on the rear door of a vehicle and particularly those vehicles known as sport/utility trucks or vans. In the several embodiments of the invention, the spare tire mounting arrangement which is secured to the door of the vehicle is used to detachably mount the carrier rack apparatus of the invention. A structural feature common to the several embodiments of the invention comprises a mounting hub which is sandwiched between the spare tire mounting arrangement on the vehicle door and the wheel of the spare tire assembly. The mounting hub comprises a mounting plate having holes and/or notches formed therein to receive lug bolts passing through lug-receiving apertures in the spare tire wheel and similar apertures in the spare tire mounting arrangement such that the mounting hub is fixed in place when the spare tire assembly is bolted to the spare tire mounting arrangement on the door of the vehicle. The mounting hub is further provided with a tubular extension element which passes through the central opening of the wheel of the spare tire assembly and which receives a corresponding tubular element formed on the rack portion of the carrier rack apparatus. The tubular extension element can be cylindrical in cross section or can be square, triangular, etc. as long as the cross-sectional shape of the tubular extension element allows cooperation with the cross-sectional shape of other elements of the carrier rack apparatus which must mate therewith.

The several embodiments of the present invention provide similar carrier rack portions which differ in structural conformation but which accomplish very similar functions. Certain embodiments of the carrier rack portions of the invention allow adjustment both vertically and horizontally of the apparatus in the several adjustable embodiments thus being capable of usage with a variety of vehicles having external spare tire mounting arrangements.

The several embodiments of the invention further provide lock-receiving apparatus which allow the carrier rack apparatus to be locked such that the carrier rack portion of the present apparatus cannot be removed by unauthorized persons.

Accordingly, it is a primary object of the invention to provide article-carrying rack apparatus capable of being mounted to a spare tire mounting arrangement such as is disposed on the exterior surface of a rear door of a vehicle.

It is another object of the invention to provide apparatus for mounting bicycles, skiis and similar articles to the existing exterior spare tire mounting arrangement on the rear door of a vehicle and wherein the position of the mounted article can be adjusted in 2°, 4°, or 6° of freedom.

A still further object of the invention is to provide apparatus for mounting bicycles, skiis and similar articles to the existing spare tire mounting arrangement on a rear door of a vehicle wherein the apparatus includes structure capable of being used with a conventional padlock or the like for preventing removal of the apparatus from the spare tire mounting arrangement by unauthorized persons.

Further objects and advantages of the invention will become more readily apparent in light of the following detailed description of the preferred embodiments.

DESCRIPTION OF THE PREFERRED EMBODIMENTS

Figure 1:
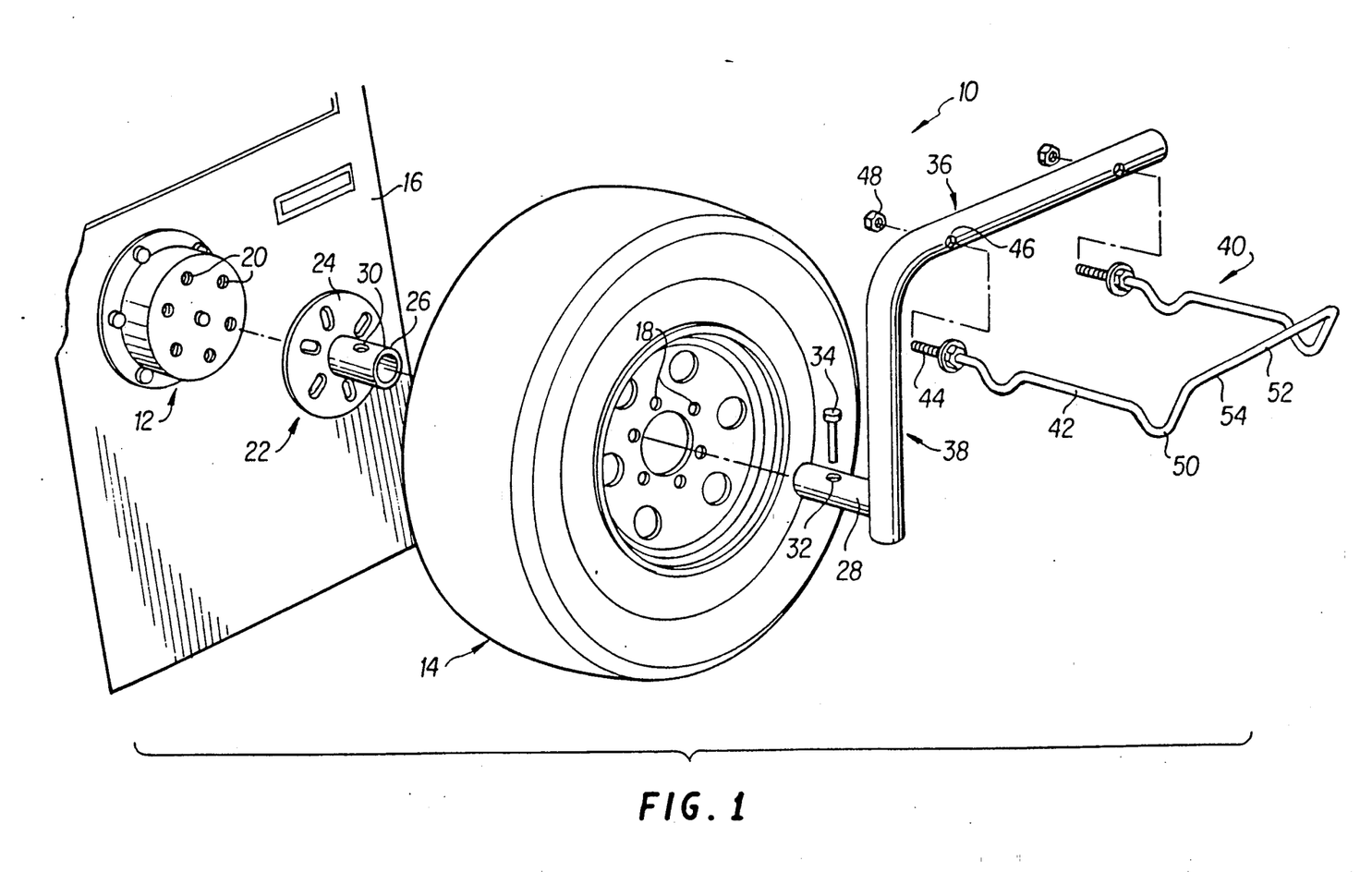
FIG. 1 is an exploded assembly view illustrating the mounting of a first embodiment of the present carrier rack apparatus to a spare tire mounting assembly secured to a door of a vehicle.

Referring now to the drawings and particularly to FIG. 1, an exploded assembly view illustrates the detachable mounting of the present carrier rack apparatus shown generally at 10 in association with a spare tire mounting arrangement 12 and a spare tire and wheel assembly 14. The spare tire mounting arrangement 12 is secured to rear vehicle door 16 such as is conventional in the art. The spare tire and wheel assembly 14 is also conventional in the art, the wheel portion of the assembly 14 having a pattern of holes which mate with a pattern of holes 20 in the spare tire mounting arrangement 12. Conventional lug bolts and nuts (not shown) extend through the aligned holes 18 and 20 in the usual situation wherein the spare tire mounting arrangement 12 acts only to mount the spare tire and wheel assembly 14 to the rear vehicle door 16.

As is seen in FIG. 1, however, the structure of the spare tire mounting arrangement 12 and of the spare tire and wheel assembly 14 is utilized to mount the carrier rack apparatus 10 to the door 16. A portion of the carrier rack apparatus 10 which is substantially common to the several embodiments of the invention is mounting hub 22 which comprises mounting plate 24 and hub extension element 26. The mounting plate 24 can be substantially circular or configured as any other geometric figure capable of providing sufficient surface area to have a pattern of holes and/or notches formed therein to align with at least some of the holes 18 and 20 described above. The mounting plate 24 is substantially planar in conformation but can be formed otherwise such as in the manner of a Belleville washer or spring, that is, slightly conical in nature, such that on compression between surfaces of the mounting arrangement 12 and of the spare tire wheel assembly 14, the mounting plate 24 can flex and effectively act to maintain the overall assembly in tension thus guaranteeing retention of nuts on the lug bolts (not shown). Centrally of the mounting plate 24 the hub extension element 26 extends outwardly of the spare tire mounting arrangement 12 and through the usual central aperture formed in the wheel portion of the spare tire and wheel assembly 14. The hub extension element 26 is hollow and can be formed with a cross section which can be circular, square, or otherwise configured as desired in order that a cooperating support extension element 28 can be received within the interior of the hub extension element 26. It should be understood that the hub extension element 26 could be received within the support extension element 28 which is also hollow. It should also be understood that the cross sectional shape of the support extension element 28 can differ from that of the hub extension element 26 as long as said element 28 can be received within the interior of the element 26 with a desirable degree of support therewithin. The hub extension element 26 has a pair of spaced aligned apertures 30 which align with a pair of spaced apertures 32 formed in the support extension element 28. When the apertures 30 and 32 are aligned, a pin 34 can be received through the pairs of aligned apertures 30/32 for holding the elements 26/28 together. The pin 34 can be of a conventional nature and can have locking or other retention capability.

The support extension element 28 forms an integral part of carrier rack support 36, the remaining portion of the carrier rack support 36 being support element 38 which can take a number of forms according to the teachings of the invention. As will be noted hereinafter, the support element 38 can be substantially L-shaped in conformation with both left and right hand arrangements depending upon the particular mounting situation which usually depends upon the location of the spare tire mounting arrangement 12 on a particular vehicle. The support element 38 can be angled such that a center mounting arrangement is possible according to the invention.

The carrier rack support 36 terminates in an article rack element 40 which is capable of mounting one or more bicycles (not shown) or articles such as skiis and the like. The article rack element 40 is substantially U-shaped with spaced leg portions 42 having threaded ends 44 which are received one each through a pair of two spaced pairs of oppositely aligned apertures 46 formed in a usually upper-most portion of the support element 38, this upper-most portion of said support element 38 generally being horizontal in disposition such that the article rack element 40 affixed thereto will hold articles such as bicycles, skiis or the like in a desired orientation relative to the vehicle and to horizontal. The threaded ends 44 of the leg portions 42 are secured by means of nuts 48.

The article rack element 40 can be seen to have bent "reed" portions 50 which facilitate the mounting of bicycles on the rack element 40. It is to be noted that bight portion 52 of the article rack element 40 extends above the plane containing the leg portions 42 by virtue of upwardly angled and extending anterior portions 54 of the leg portions 42, this structure acting to prevent injury to the eyes or face of a user when mounting or demounting a bicycle or the like from the carrier rack apparatus 10.

The stock from which the carrier rack support 36 is formed, including the stock from which the support extension element 28 and the support element 38 are formed, is preferably tubular and of a diameter of approximately 1¾". It should be understood, however, that the structures can be formed of stock which is square in cross section or which is otherwise configured as desired. The article rack element 40 is preferably formed of ½" steel rod.

Figure 2:
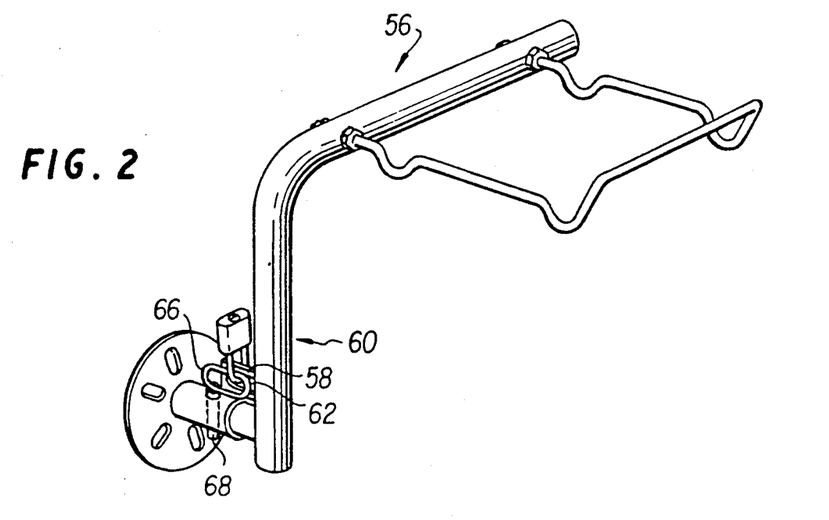
FIG. 2 is an assembly view of another embodiment of the present carrier rack apparatus including structure facilitating locking of the apparatus and shown without the spare tire and wheel for ease of illustration.

Referring now to FIG. 2, a carrier rack apparatus 56 is shown in an exploded assembly view without a spare tire mounting arrangement or spare tire and wheel assembly such as is shown in FIG. 1. This conventional structure is left out of FIG. 2 and the remaining figures for ease of illustration. The carrier rack apparatus 56 of FIG. 2 additionally comprises a lock receiving plate 58 formed on support element 60 which is substantially identical to the support element 38 of FIG. 1. The lock receiving plate 58 has an oval aperture 62 formed therein which aligns with an aperture 64 formed in lock receiving plate 66 formed on pin 68. The function of the pin 68 is substantially identical to that of the pin 34 shown at FIG. 1. However, the lock receiving plate 66 formed on the "head" of the pin 68 allows locking of the several portions of the carrier rack apparatus 56 together such as by receipt of a padlock through the apertures 62/64 when said apertures are brought into at least partial alignment. Use of the lock receiving structure embodied in the plates 58 and 66 prevents removal of the support element 60 from the apparatus 56 by an unauthorized person.

Figure 3:
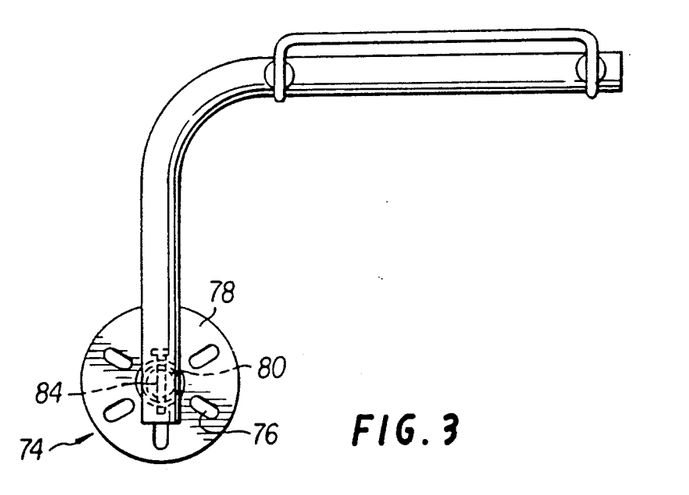
FIG. 3 is a front elevational view of the embodiment of FIG. 1 shown without the spare tire and wheel for ease of illustration.
Figure 4:
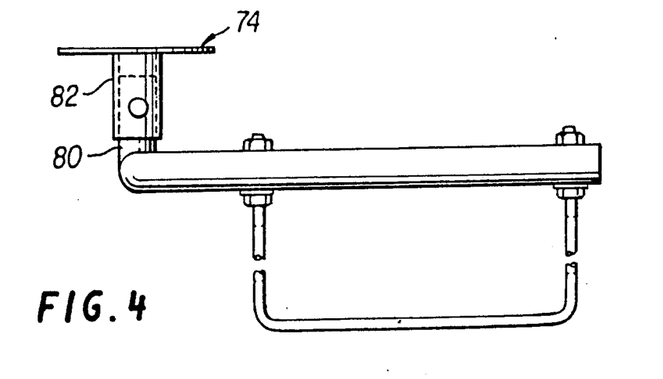
FIG. 4 is a plan view of the structure of FIG. 3.
Figure 5A:
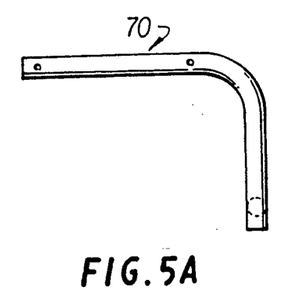
FIGS. 5A, 5B, and 5C are front elevational views of several embodiments of rack portions of the apparatus.
Figure 5B:
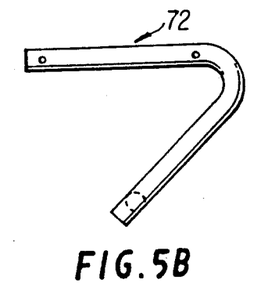
Figure 5C:
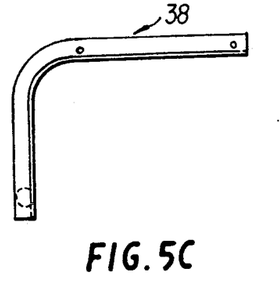

FIGS. 3, 4 and 5A, B and C particularly illustrate the structure of the support element portion of the certain embodiments of the carrier rack apparatus of the invention. Referring again to FIG. 1 in relation to FIG. 3 and FIG. 4, the support element 38 is seen to take the form of hollow, "tubular" piping bent at a 90° angle. The "right hand" support element 38 can also be seen in FIG. 5C. FIG. 5A shows a "left hand" support element 70 which is substantially identical in structure to the "right hand" support element 38 except that it is the mirror image and would fit on a "right hand" door of a vehicle (not shown) rather than the "left hand" rear door of a vehicle. FIG. 5B illustrates a "center" embodiment designated as 72. The support elements 38, 70 and 72 are all provided with support extension elements such as the element 28 described relative to FIG. 1 and cooperatively mate with mounting hubs such as is shown as the mounting hub 22 of FIG. 1 and the mounting hubs described relative to other figures.

FIG. 3 illustrates a mounting hub 74 having only three spaced apertures 76 formed in plate 78 of the hub 74, the apertures 76 being substantially oval in conformation and conveniently aligning with corresponding aperture patterns (not shown) such as are conventional in certain spare tire mounting arrangements and certain spare tire and wheel assemblies similar to the arrangement 12 and assembly 14 shown relative to FIG. 1. FIGS. 3 and 4 also illustrate the receipt of support extension element 80 into hub extension element 82, the figures further showing a pin 84 which secures the elements 80 and 82 together.

Figure 6:
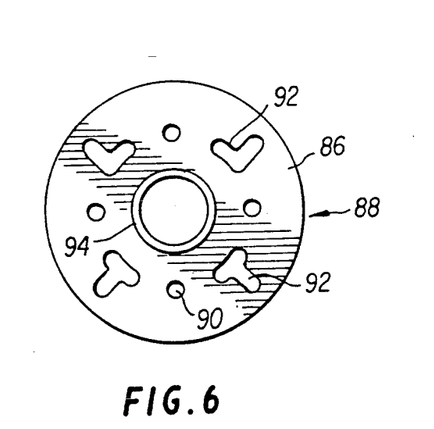
FIG. 6 is a front elevational view of a mounting hub of the invention.

FIG. 6 illustrates a mounting plate 86 of a mounting hub 88, the plate 86 having a pattern of holes 90 and notches 92 which can accommodate different wheel bolt patterns as are encountered in the art. In FIG. 6, hub extension element 94 is seen as a circle since said element 94 extends directly from the plane of the page in the view illustrated in FIG. 6.

Figure 7:
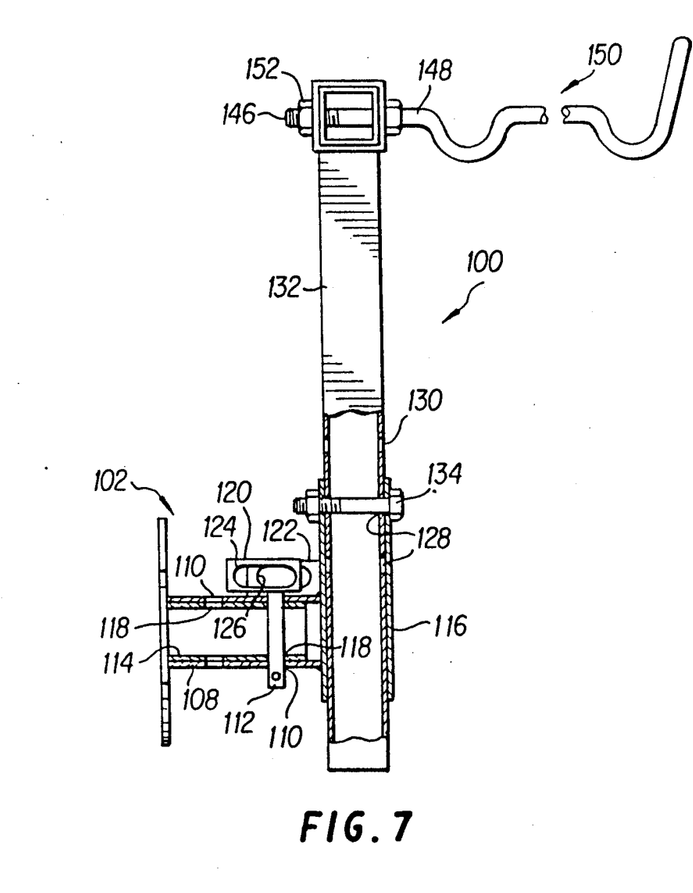
FIG. 7 is a side elevational view of an embodiment of the invention which is adjustable.
Figure 8:
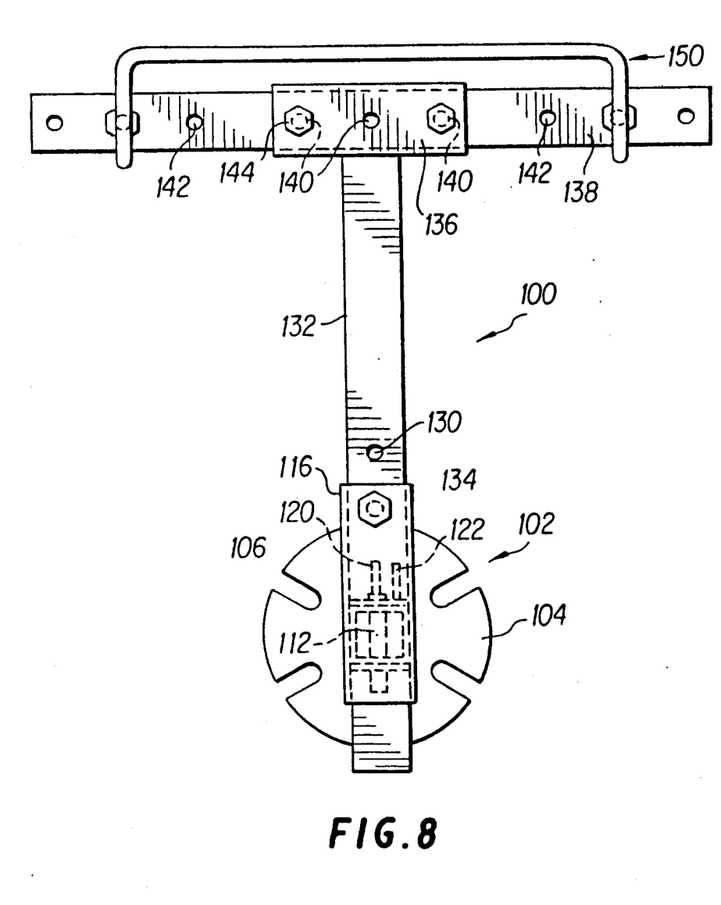
FIG. 8 is a front elevational view of the embodiment of FIG. 7.
Figure 9:
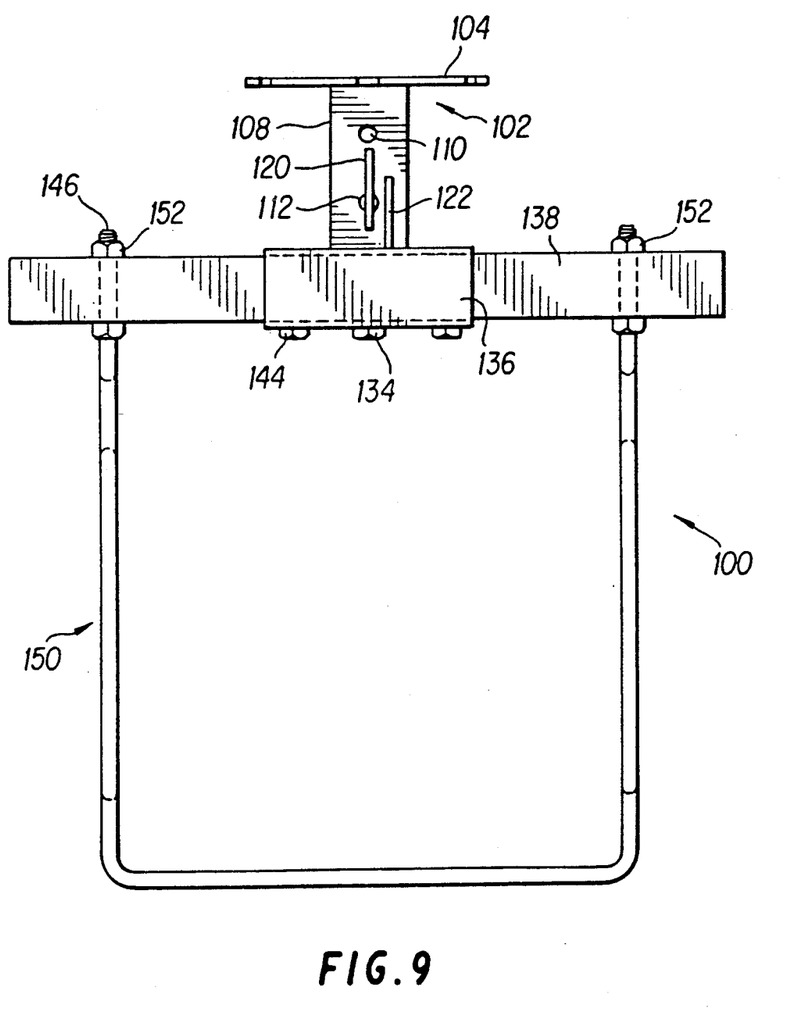
FIG. 9 is a plan view of the embodiment of FIG. 7.

Referring now to FIGS. 7, 8 and 9, an embodiment of the present carrier rack apparatus is shown generally at 100 to be incrementally adjustable both vertically and in two horizontal degrees of freedom. The embodiment of FIGS. 7 through 9 can effectively serve as "right hand", "left hand", and "center" mounted structures in addition to being adjustable as aforesaid. Mounting hub 102 of the apparatus 100 comprises a mounting plate 104 having six regularly spaced notches 106 formed in the perimeter of the plate 104, the notches 106 facilitating mounting on spare tire mounting arrangements (not shown) having a six-bolt lug pattern. The mounting plate 104 could also be formed with five regularly spaced notches (not shown) or other patterns of holes and notches as desired. A hub extension element 108 extends centrally from the mounting plate 104 and is hollow. Two pair of apertures 110 are formed in the hub extension element 108 with each pair being aligned such that a pin 112 can be extended into either pair of the apertures 110. As with the embodiment of FIG. 1, a support extension element 114 (corresponding to the support extension element 28 of FIG. 1), is integrally formed with an elongated sleeve 116. Both the support extension element 114 and the elongated sleeve 116 are formed of square stock as is the hub extension element 108. The support extension element 114 has two pair of apertures 118 which respectively align with the pairs of apertures 110 formed in the hub extension element 108. Accordingly, the pin 112 can be received in either set of aligned pairs of the apertures 110/118 such that the apparatus 100 can be adjusted in a direction perpendicular to the plane of the mounting plate 104. In such an adjustment, the outermost pair of aligned apertures 118 in the support extension element 114 can be aligned with the outermost pair of apertures 110 in the hub extension element 108. Thus, the carrier rack apparatus 100 would be in its greatest extension. Alignment of the innermost pair of the apertures 118 with the outermost pair of apertures 110 provides the most compact conformation of the apparatus 100 in the horizontal direction perpendicular to the plane of the mounting plate 104. Due to the formation of lock receiving plate 120 on the head of the pin 112 and due to the position of lock receiving plate 122 on an opposing wall of the sleeve 116. Each of the plates 120 and 122 are provided with oval apertures 124 and 126 which at least partially align to allow receipt of a padlock or the like to provide a desired locking function.

The elongated sleeve 116 is provided with preferably two pair of aligned apertures 128 in the upper half of the sleeve 116. The pairs of apertures 128 selectively align with corresponding pairs of apertures 130 formed in elongated support element 132, the support element 132 sliding within the elongated sleeve 116 to a desired position whereby the pairs of apertures 128 and 130 can be aligned to receive nut and bolt connector 134 such that the support element 132 slides to a desired incremental adjustment within the elongated sleeve 116, a vertical adjustment being thereby provided.

The support element 132 terminates at its upper end in a horizontal sleeve 136 within which horizontal support bar 138 is slidable to adjust the position of said bar 138 in a horizontal direction. The horizontal sleeve 136 is provided with preferably three aligned pairs of apertures 140 which align with selected pairs of aligned apertures 142 formed in the support bar 138. Nut and bolt connectors 144 extending through the aligned pairs of apertures 140 and 142 fix the horizontal sleeve 136 to the support bar 138 as desired. The pairs of apertures 142 also receive threaded ends 146 of lugs 148 of an article rack element 150, the article rack element 150 being substantially identical to the article rack element 40 of FIG. 1. Nuts 152 act to fix the article rack element 150 to the support bar 138. It is to be understood that the article rack element 150 can be adjusted along the length of the support bar 138.

Accordingly, the carrier rack apparatus 100 of FIGS. 7, 8 and 9 is adjustable in six degrees of freedom such that the apparatus 100 can be used as right hand, left hand and center mounted structures adaptable to the structural peculiarities of the various spare tire mounting arrangements existing on rear vehicle doors. A further reference to FIG. 9 illustrates the off set location of the lock receiving plate 122 which allows receipt of the pin 112 into the pairs of apertures 110 and 118 as aforesaid, the plates 120 and 122 remaining sufficiently close together to allow receipt of a padlock or the like through the apertures 124 and 126 of the plates 120/122.

Figure 10:
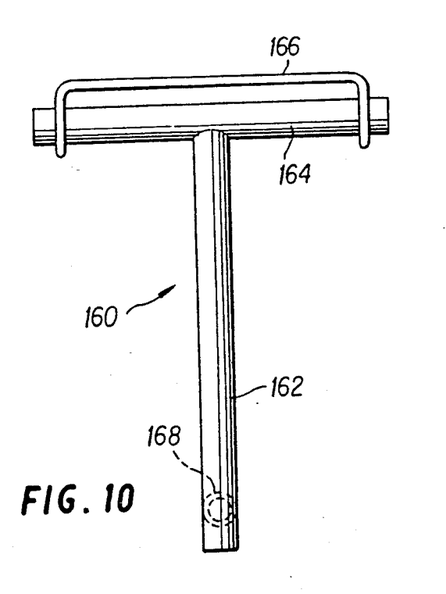
FIG. 10 is a front elevational view of the rack portion of a further embodiment of the invention; and, FIG. 11 is a plan view of the structure of FIG. 10.
Figure 11:
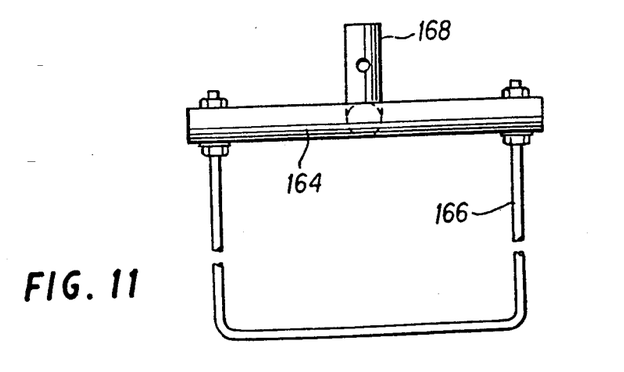

Referring now to FIGS. 10 and 11, a further embodiment of the invention is seen to be useful as a center mounted carrier rack apparatus 160 which comprises an elongated support element 162 which terminates at one end with a support bar 164 which mounts an article rack element 166, the article rack element 166 being substantially identical to the article rack element 40 of FIG. 1. At the other end of the support element 162 is a support extension element 168 which is substantially identical to the support extension element 28 of FIG. 1. Although not shown in FIGS. 10 and 11, the support extension element 28 would mate with a hub extension element of a mounting hub such as the element 26 and hub 22 of FIG. 1. For the sake of illustration, FIGS. 10 and 11 do not show a mounting hub such as the mounting hub 22 of FIG. 1 or the mounting hubs of other figures since it is believed that the operation of the embodiment of FIGS. 10 and 11 is apparent without the additional illustration.

It also should be understood that the several embodiments of the invention both with and without lock receiving structure can be used with mounting hubs of varying configuration. Further, it is to be understood that various features of the several embodiments of the invention can be used in cooperation with certain other elements and features of the several embodiments even though not expressly shown. In essence, the scope of the invention is to be interpreted only in light of the definition provided by the appended claims.

What is claimed is:

1. An apparatus for mounting articles to a vehicle exteriorly of the vehicle, said vehicle having a spare tire mounting arrangement for mounting a spare tire and wheel assembly having a central aperture, said apparatus comprising:
   a hub having a plate element and a hollow hub extension element extending centrally from the plate element, the plate element being adapted to be mounted to said spare tire mounting arrangement and positioned between the spare tire mounting arrangement and the spare tire and wheel assembly, such that the hub extension element extends through the central aperture of the wheel assembly;
   support means for mounting said articles to the vehicle and having a support extension element slidably receivable within the hollow extension element; and,
   means for securing the support extension element to the hub extension element.

2. The apparatus of claim 1 and further comprising a lock receiving means for receiving a lock to secure the support means to the hub to prevent unauthorized removal of the support means.

3. The apparatus of claim 1 and further comprising means for adjusting the support means relative to the vehicle.

4. An apparatus for mounting articles to a vehicle exteriorly of the vehicle, said vehicle having a spare tire mounting arrangement for mounting a spare tire and wheel assembly having a central aperture, said apparatus comprising:
   a hub having a plate element and a hollow hub extension element extending centrally from the plate element, the plate element being adapted to be mounted to said spare tire mounting arrangement and positioned between the spare tire mounting arrangement and the spare tire and wheel assembly, such that the hub extension element extends through the central aperture of the wheel assembly;
   support means for mounting said articles to the vehicle and having a hollow support extension element, one of the hollow hub extension elements and the hollow support extension element being slidably received within the other of the said support extension element and the said hub extension element; and,
   means for securing the support extension element to the hub extension element.

5. The apparatus of claim 4 and further comprising a lock receiving means for receiving a lock to secure the support means to the hub to prevent unauthorized removal of the support means.

6. The apparatus of claim 4 and further comprising means for adjusting the support means relative to the vehicle.

7. The apparatus of claim 4 and further comprising at least one lug bolt and nut for connecting the spare tire mounting arrangement and the spare tire and wheel assembly, and wherein the plate element has at least one opening formed therein for receiving the lug bolt therethrough, thereby mounting the hub between the spare tire mounting arrangement and the spare tire and wheel assembly on receipt of the nut on the lug bolt.

8. The apparatus of claim 7 wherein the plate element has a plurality of the openings formed therein, each of the openings receiving one lug bolt, thereby mounting the hub between the spare tire mounting arrangement and the spare tire and wheel assembly.

9. The apparatus of claim 8 wherein the openings are shaped and formed in a pattern capable of receiving varying patterns of the lug bolts.

10. The apparatus of claim 8 wherein the openings form notches disposed in a peripheral edge of the plate element.

11. The apparatus of claim 8 wherein the openings are ovoid in conformation with the major axis of each opening lying along a radius extending centrally from the connection of the extension element to the plate element.

12. The apparatus of claim 4 wherein the support means comprise a first support element mounting the support extension element and a second support element joined to the first support element at an angular relation thereto, the support means further comprising a carrier rack adapted to be mounted to the second support element, the carrier rack supporting said articles.

13. The apparatus of claim 12 wherein the first and second support elements are joined to each other at an angle of 90°.

14. The apparatus of claim 12 wherein the first and second support elements are joined to each other at an acute angle.

15. The apparatus of claim 12 wherein the second support element is joined to the first support element medially of the length of said second support element, the first and second support elements being joined to each other at an angle of 90°.

16. The apparatus of claim 12 wherein a securing means comprise a pin, the hub extension element and the support extension element each having at least one set of aligned openings formed therein, the sets of openings being alignable to receive the pin through both the hub extension element and the support extension element to secure the hub extension element to the support extension element.

17. The apparatus of claim 16 wherein the hub extension element and the support extension element have a plurality of sets of aligned openings formed therein, the sets of openings in each said element being alignable with at least one set of openings in the other said element for receiving the pin therethrough, the said elements being slidable relative to each other to allow alignment of said openings and adjustment of said elements relative to each other.

18. The apparatus of claim 4 wherein the support means comprise a first support element formed of a support sleeve and a sliding support element receivable within the support sleeve, the support sleeve mounting the support extension element, the support sleeve and the sliding support element each having at least one set of aligned openings formed therein, the sets of openings being alignable on sliding movement of the support sleeve and the sliding support element relative to each other, the support means further comprising a first securing element receivable through the sets of openings and thereby through the support sleeve and the sliding support element for securing the said support sleeve and the said sliding support element together, the support sleeve and the sliding support element being thereby adjustable in position relative to each other.

19. The apparatus of claim 18 and further comprising a horizontal support sleeve disposed on a distal end of the sliding support element and a sliding support bar slidably movable within the horizontal support sleeve, the horizontal support sleeve and the sliding support bar each having at lest one set of aligned openings formed therein, the sets of openings being alignable on sliding movement of the horizontal support sleeve and the sliding support bar relative to each other, the support means further comprising a second securing element receivable through the sets of openings formed in the horizontal support sleeve and the sliding support bar thereby to secure the horizontal support sleeve and the sliding support bar together, the horizontal support sleeve and the sliding support bar being thereby adjustable in position relative to each other.

20. The apparatus of claim 19 and further comprising a carrier rack mountable to the sliding support bar.

* * * * *